United States Patent
Yamada et al.

(10) Patent No.: US 6,623,795 B2
(45) Date of Patent: Sep. 23, 2003

(54) ONE-PACK TYPE URETHANE SEALING MATERIAL FOR A CAR BODY AND METHOD FOR SEALING A CAR BODY USING THE SAME

(75) Inventors: Atsushi Yamada, Kanagawa Prefecture (JP); Keiichi Yokouchi, Aichi-ken (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/919,837

(22) Filed: Aug. 2, 2001

(65) Prior Publication Data

US 2002/0046806 A1 Apr. 25, 2002

(30) Foreign Application Priority Data

Aug. 10, 2000 (JP) .......................... 2000-242898

(51) Int. Cl.$^7$ .................................. B05D 3/02
(52) U.S. Cl. ................. 427/180; 427/207.1; 427/385.5
(58) Field of Search ............................. 427/207.1, 180, 427/385.5

(56) References Cited

FOREIGN PATENT DOCUMENTS

| JP | 59-169084 | * | 9/1984 |
| JP | 60-231744 | * | 11/1985 |
| JP | 60-252657 | * | 12/1985 |
| JP | 02-038309 | * | 2/1990 |
| JP | 02-150489 | * | 6/1990 |
| JP | 08-269319 | * | 10/1996 |
| JP | 10-245221 | * | 9/1998 |
| JP | 11-349846 | * | 12/1999 |

OTHER PUBLICATIONS

Kirk–Othmer Encyclopedia of Chemical Technology, Fourth Edition, vol. 24, pp. 695 and 715–719, 1997.*

* cited by examiner

Primary Examiner—Erma Cameron
(74) Attorney, Agent, or Firm—Finnegan, Henderson, Farabow, Garrett, & Dunner LLP

(57) ABSTRACT

A one-pack type urethane sealing material comprising precipitated calcium carbonate treated with a fatty acid alkali metal salt, wherein the sealing material cures by both factors of moisture and heating. Also, a method for sealing a car body comprising using the one-pack type urethane sealing material for a car body as a sealing material. The sealing material has a shape maintaining ability and can be cured by heating and causes no foaming upon heating in a high temperature and high humidity environment such as summer seasons, so that it can be used advantageously as a sealing material for a car body.

4 Claims, No Drawings

ONE-PACK TYPE URETHANE SEALING MATERIAL FOR A CAR BODY AND METHOD FOR SEALING A CAR BODY USING THE SAME

BACKGROUND OF THE INVENTION

1. Field of the Invention

The present invention relates to a one-pack type urethane sealing material for a car body, and more particularly, to a one-pack type urethane sealing material for a car body which material cures by both factors of moisture and heating. The present invention also relates to a method for sealing a car body with such a urethane sealing material.

2. Description of the Related Art

A car body is fitted at its panel joint portions with a sealing material for watertightness, corrosion protection, and airtightness. In a car assembly line, after a sealing material is fitted to joint portions of a car body panel or part, a paint is coated on the sealing member, and the coated sealing member is directly sent to a paint baking step, where the paint is baked in a baking oven at about 140° C. Because of this procedure, vinyl chloride based sol compositions have hitherto been used for a sealing material for a car body since they can maintain their shape until they enter the baking oven and are of the heat curing type.

Under high temperature and high humidity conditions as in summer seasons, when a sealing material made of a vinyl chloride based sol composition is subjected to a high temperature and high humidity environment after it is fitted to the joint portions, the sealing material absorbs moisture. In this case, afterwards when the sealing material passes the baking oven the moisture contained in the sealing material vaporizes abruptly to form foams in the sealing material. As a result cracks occur in the paint coated on the sealing material. To remove the moisture in the sealing material, a preliminary drying oven must be provided in order to dry the sealing material at a temperature around 100° C. before it can be passed through the paint baking oven.

On the other hand, in recent years, substitutes for vinyl chloride based sol compositions have been desired from the viewpoint of environment protection. However, on the other side of the coin such a substitution requires change of order of operations in automobile assembly line by shifting the step of fitting of a sealing material to after the steps of coating and baking. Such a change in the assembly line is practically impossible from the viewpoint of costs and the like.

Therefore, development of a car body sealing material that does not form foams under high temperature and high humidity conditions and even in a paint baking oven and of a car body sealing method using such a sealing material has been keenly demanded.

Meanwhile, the technology of using a moisture curing one-pack type urethane composition as a sealing material for roofs, walls and the like has been known.

However, when such a moisture curing one-pack type urethane sealing material is used as a sealing material for a car body, the sealing material does not cure after the baking step.

SUMMARY OF THE INVENTION

Accordingly, an object of the present invention is to solve the problem of the prior art as described above and provide a sealing material that has a shape maintaining ability and can cure without causing any foaming in a high temperature and high humidity environment as in summer seasons even in a high temperature baking oven.

Another object of the present invention is to provide a method for sealing a car body with such a sealing material.

The present inventors have made extensive study with a view to solving the problems described above and as a result they have found that use of a moisture curing one-pack type urethane sealing material as a sealing material in order to prevent foaming due to vaporization of moisture and addition of a precipitated calcium carbonate treated with a fatty acid alkali metal salt thereto can afford a one-pack type urethane sealing material that can cure by heating. The present invention is based on this discovery.

That is, the one-pack type urethane sealing material for a car body of the present invention contains precipitated calcium carbonate treated with a fatty acid alkali metal salt, wherein the sealing material cures by both factors of moisture and heating.

Further, a car body sealing method of the present invention comprises using the one-pack urethane sealing material for a car body described above as a car body sealing material.

The one-pack type urethane sealing material for a car body of the present invention has shape maintaining ability (thixotropy) and can be cured by heating and causes no foaming upon heating in a high temperature and high humidity environment such as summer seasons, so that it can be used advantageously as a sealing material for a car body.

According to the car body sealing method of the present invention, because of use of the one-pack type urethane sealing material as described above, it can be advantageously incorporated into a car assembly line that performs the baking step in a heating oven after fitting the sealing material and that does not require a drying step in a preliminary drying oven as in the conventional technique so that the assembly line can be made simpler.

DETAILED DESCRIPTION OF THE INVENTION

First, the one-pack type urethane sealing material for a car body of the present invention will be explained hereinbelow.

The one-pack type urethane sealing material for a car body of the present invention contains a urethane prepolymer. The urethane prepolymer is not particularly limited and generally any urethane prepolymer may be used as far as it is produced from a polyol compound, i.e., a kind of polyhydroxyl compounds, and a polyisocyanate compound.

The polyol compound is a generic name for alcohols derived from hydrocarbons by substituting a plurality of hydrogen atoms thereof for hydroxyl groups and includes polyether polyols, polyolefin polyols, polyester polyols, other polyols than the above and mixtures of two or more of these polyols.

Examples of the polyether polyol include polyols obtained by adding one or more alkylene oxides such as ethylene oxide, propylene oxide, butylene oxide, and styrene oxide to one or more of dihydric alcohols such as ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane; polyhydric alcohols such as glycerol, 1,1,1-trimethylolpropane, and 1,2,5-hexanetriol, pentaerythritol; diamines such as ethylenediamine, aromatic diamines; one or more sugars such as sorbitol; and polyoxytetramethylene oxide and the like.

Examples of the polyester polyol include condensation polymers obtained from one or more of ethylene glycol, propylene glycol, butanediol, pentanediol, hexanediol, cyclohexanedimethanol, glycerol, 1,1,1-trimethylolpropane, or other low molecular weight polyols, and one or more of glutaric acid, adipic acid, pimelic acid, suberic acid, sebacic acid, terephthalic acid, isophthalic acid, dimeric acid, or other low molecular weight carboxylic acids; ring open polymers such as propionolactone and valerolactone, and the like.

Suitable examples of the polyols other than the above include polyols whose main chain is composed of carbon—carbon bond, for example, acrylic polyol, polybutadiene polyol, hydrogenated polybutadiene polyol, low molecular weight polyols such as ethylene glycol, diethylene glycol, propylene glycol, dipropylene glycol, butanediol, pentanediol, and hexanediol.

These polyols may be used singly or two or more of them may be used in combination. Preferred polyols have a weight average molecular weight of about 1,000 to about 10,000, more preferably about 3,000 to about 7,000.

The polyisocyanate compound includes various types usually used in preparing polyurethane resins. Specific examples thereof include 2,4-tolylene diisocyanate, 2,6-tolylene diisocyanate, diphenylmethane-4,4'-diisocyanate, and modified preparations thereof, 1,5-naphthalene diisocyanate, ethylene diisocyanate, propylene diisocyanate, tetramethylene diisocyanate, hexamethylene diisocyanate, isophorone diisocyanate, xylylene diisocyanate, triphenylmethane triisocyanate and the like. These polyisocyanate compounds may be used singly or two or more of them may be used in combination.

When a urethane prepolymer is prepared from the polyol compound and polyisocyanate compound described above, the mixing ratio of the polyisocyanate compound to the polyol compound, i.e., NCO/OH ratio by equivalent, is usually NCO/OH=1.2 to 3.0, preferably 1.5 to 2.0. Such a urethane prepolymer can be produced by mixing the polyol compound and the polyisocyanate compound in the equivalent ratio mentioned above and heating the mixture at 30 to 120° C., preferably 50 to 100° C. in the presence of or in the absence of a catalyst with stirring.

The urethane sealing material of the present invention may contain conventionally known polyisocyanate compounds in addition to the terminal active isocyanate group-containing urethane prepolymer. More specifically, all the polyisocyanate compounds described above that can be used in the production of prepolymer may be used.

The urethane sealing material of the present invention contains precipitated calcium carbonate treated with a fatty acid alkali metal salt as a filler.

As will be explained in Comparative Example 1 hereinbelow, usually, moisture curing urethane sealing materials are curable with moisture but they cannot be cured sufficiently when they are heated.

On the other hand, the urethane sealing material that contains precipitated calcium carbonate treated with fatty acid alkali metal salt has been already known as a moisture curing composition. However, the present inventors have found that the sealing material can be sufficiently cured in a heating step due to the both factors of moisture and heating.

That is, the urethane sealing material of the present invention can be sufficiently cured due to the both factors of moisture and heating so that it can be used most advantageously as a urethane sealing material for a car body.

The reason why the treatment with a fatty acid alkali metal salt renders the urethane sealing material heat-curable is not clarified yet. However, it is believed that when a usually moisture curable urethane sealing material is heated for a certain time at such a considerably high temperature as in a coating and baking step, the moisture is released to outside the system resulting in insufficient moisture curing whereas use of a fatty acid alkali metal salt adjusts the balance between the release of moisture and increase in reaction rate by heating, thus enabling curing due to the both factors of moisture and heating.

Also, it is believed that this is also applied to the phenomenon of foaming during the heating step at high temperature and high humidity and the composition of the present invention shows no phenomenon of foaming since the release of moisture and curing rate are well balanced.

The urethane sealing material of the present invention even containing at least 0.005 wt % of water, preferably 0.01 to 0.05 wt % of water can be cured by heating without foaming and is cured to a product having a smooth surface.

The fatty acid used as a raw material of fatty acid alkali metal salt used for surface treatment of precipitated calcium carbonate includes saturated fatty acids (for example, butyric acid, valeric acid, caproic acid, enanthic acid, caprylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid), unsaturated fatty acids (for example, crotonic acid, isocrotonic acid, undecylenoic acid, oleic acid, elaidic acid, cetoleic acid, erucic acid, brassidic acid, sorbic acid, rinolic acid, rinolenic acid, arachidonic acid, propiolic acid, stearolic acid) and the like, with stearic acid, lauric acid, and palmitic acid being preferred.

The alkali metal contained in the fatty acid alkali metal salt includes lithium, sodium, potassium, rubidium, and cesium, with lithium and sodium being preferred.

Preferred examples of the fatty acid alkali metal salt include lithium stearate, sodium stearate, lithium laurate, sodium laurate, and sodium palmitate.

To maintain storage stability at a suitable level and improve curability, the content of the surface treated precipitated calcium carbonate is preferably from 30 to 200 parts by weight, more preferably 50 to 150 parts by weight, per 100 parts by weight of urethane prepolymer.

The production method for the precipitated calcium carbonate surface treated with a fatty acid alkali metal salt is not particularly limited. Commercially available preparations may be used. Also, precipitated calcium carbonate produced by a known method may be dipped in a solution of a fatty acid alkali metal salt, or the fatty acid alkali metal salt solution may be coated, sprayed or added to the precipitated calcium carbonate, which may be optionally dried to produce the surface treated precipitated calcium carbonate that can be used in the present invention.

To further improve the physical properties of the sealing material, the urethane sealing material of the present invention may optionally contain, in addition to the components described above, other fillers, other resin components, plasticizers, latent curing agents, catalysts, antioxidants, silane coupling agents, dispersants, solvents, thixotropic agents, ultraviolet absorbents, dyes, organic pigments, inorganic pigments, flame retardants and the like within the range such that the object of the present invention is not damaged.

The filler used as an optional component includes carbon black, ground calcium carbonate, clay, talc, titanium oxide, unslaked lime (calcium oxide), kaolin, zeolite, diatomaceous earth, glass balloon and the like. In view of further improvement in deep curing property, heavy calcium carbonate is preferred.

The plasticizer used as an optional component is not particularly limited and includes, for example, dioctyl phthalate (DOP), dibutyl phthalate (DBP), dilauryl phthalate (DLP), butyl benzyl phthalate (BBP), diisodecyl phthalate (DIDP), diisononyl phthalate (DINP), dioctyl adipate (DOA), diisononyl adipate (DINA), diisodecyl adipate, trioctyl phosphate, tris (chloroethyl) phosphate, tris (dichloropropyl) phosphate, tributyl trimellitate (TBTM), trioctyl trimellitate (TOTM), adipic acid propylene glycol polyester, adipic acid butylene glycol polyester, alkyl epoxystearate, and epoxylated soybean oil.

The latent curing agent used as an optional component is not particularly limited as far as it does not deteriorate the storage stability. It includes, for example, latent curing agent that is activated by hydrolysis, specific examples of which include amine based latent curing agents such as ketimines and enamines that are reaction products between a polyamine and a carbonyl compound, and oxazolidines that are reaction products between an amino alcohol and a carbonyl compound.

The catalyst used as an optional component is not particularly limited and includes, for example, metal catalysts such as dioctyltin dilaurate (DOTL), dibutyltin dilaurate (DBTL), zinc octylate, metal catalysts such as organobismuth compounds, amine catalysts such as triethylenediamine and morpholine.

The antioxidant used as an optional component is not particularly limited and includes, for example, phenol derivatives, aromatic amine derivatives, piperidine derivatives and the like.

The blending amounts of these additives are of course within the ranges where the object of the present invention is not damaged. The production method for one-pack type urethane sealing material for a car body of the present invention is not particularly limited. Preferably the components mentioned above are sufficiently kneaded under reduced pressure using a stirring apparatus such as a mixer for uniform dispersion to form a sealing material.

The urethane sealing material of the present invention cures by the both factors of moisture and heating as described above.

By the term "heating" as used herein is meant heating at 120° C. or more for 15 minutes or more.

By the term "moisture" as used herein is meant a relative humidity of 55% or more at 20° C.

The urethane sealing material of the present invention completely cures by both factors of moisture and heating as described above, and preferably it is heated at 130 to 160° C. for 15 to 45 minutes.

Since the urethane sealing material of the present invention is moisture curing, it uses the absorbed moisture for curing the sealing material even in a high temperature and high humidity environment. As a result, it does not cause the phenomenon of foaming in the baking step of a car assembly line.

Method for Sealing a Car Body

Next, the method for sealing a car body according to the present invention will be explained.

The method for sealing a car body according to the present invention is to coat the one-pack type urethane sealing material for a car body of the present invention described above to a joint portion of panels of a car body after the electrocoating and baking in the coating step of a car assembly line and then heat it in a coat baking oven to completely cure it.

The baking temperature must satisfy the above-mentioned heating conditions but preferably 120 to 180° C. and more preferably 130 to 160° C. The heating time satisfies the above hating conditions and is preferably 15 to 45 minutes.

According to the method for sealing a car body of the present invention, a sealing material coated on a joint portion between the end plates of car body steel plates and left to stand in a humidity atmosphere having a relative humidity of 55% or more at 20° C., even immediately after hating at a temperature of 120° C. or more for 15 minutes, causes no phenomenon of foaming in the sealing material so that a cured product having a smooth surface of the sealing material.

Because of use of the one-pack type sealing material for a car body, the method for sealing a car body of the present invention can be completely cured in the coat baking oven after the step of coating a sealing material without generating foams in the sealing material, so that subsequent steps cannot be adversely affected. Further, the treatment in a preliminary drying furnace for drying sealing materials that has been necessary in the conventional methods is no longer necessary so that the time for car assembly can be shortened.

EXAMPLES

Preparation of One-Pack Type Urethane Sealing Material for a Car Body

The raw materials shown below were used in amounts shown in Table 1 below to obtain various urethane sealing materials shown in Table 1.

TABLE 1

|  | Example | | | Comparative Example | | |
|---|---|---|---|---|---|---|
|  | 1 | 2 | 3 | 1 | 2 | 3 |
| Urethane prepolymer | 100 | 100 | 100 | 100 | — | — |
| Vinyl chloride based resin | — | — | — | — | 50 | — |
| Acryl based resin | — | — | — | — | — | 50 |
| Surface treated calcium carbonate 1 | 70* | 50* | 120** | — | — | — |
| Surface treated calcium carbonate 2 | — | — | — | 70 | 70 | 70 |
| Heavy calcium carbonate | 30 | 30 | 30 | 30 | 30 | 30 |
| Blocked isocyanate | — | — | — | — | 3 | 3 |
| Plasticizer | 20 | — | — | 20 | 100 | 100 |

Urethane prepolymer: G5000/TDI

Surface treated calcium carbonate 1: sodium stearate* and sodium laureate** treated calcium carbonate Surface treated calcium carbonate 2: Sealet 200, produced by Maruo Calcium Co. (urethane surface treatment)

Ground calcium carbonate: Super S, produced by Maruo Calcium Co.,

Plasticizer: Diisononyl phthalate

Curing Test

To examine the curing property of the urethane sealing material thus prepared at high temperatures, each urethane sealing material was coated on an electrocoating plate, which was heated in an oven at 140° C. for 30 minutes. The state of each urethane sealing material after the heating was observed and the completely cured sample was evaluated as ○ and non-cured sample was evaluated as X. The results obtained are shown in Table 2 hereinbelow.

Foaming Test

To examine whether or not foams were generated in each of the sealing materials mentioned above at a high temperature, each sealing material was coated on an electrocoating plate and left to stand at 35° C. and at a relative humidity of 80% for 48 hours. Thereafter, each coated plate was heated in an oven at 140° C. for 30 minutes. Each coated surface after the heating was observed and the sample which caused no foaming was evaluated as ○ and the sample which caused foaming was evaluated as X. The results obtained are shown in Table 2 below.

TABLE 2

|  | Example | | | Comparative Example | | |
| --- | --- | --- | --- | --- | --- | --- |
|  | 1 | 2 | 3 | 1 | 2 | 3 |
| Curing property (140° C., 30 minutes) | ○ | ○ | ○ | X | ○ | ○ |
| Foaming after absorbing moisture | ○ | ○ | ○ | ○ | X | X |

As shown in Table 2, the samples of Examples 1 to 3 that use the sealing material of the present invention can cure completely at such a high temperature as high as 140° C. because of use of calcium carbonate surface-treated with the fatty acid alkali metal salt, whereas the sample of Comparative Example 1 that uses a surface treating agent for calcium carbonate other than the fatty acid alkali metal salt gelatinizes.

Further, the samples of Examples 1 to 3 that use the sealing material of the present invention employ a moisture curing urethane prepolymer so that the moisture absorbed is used for curing, with the result that the samples of Examples 1 to 3 cause no foaming at a temperature as high as 140° C. whereas the samples of Comparative Examples 2 and 3 that use no urethane prepolymer cause foaming.

Although description has been made in the foregoing on the one-pack type urethane sealing material for a car body of the present invention and the method for sealing a car body using such a urethane sealing material, the present invention is not limited by the examples and various variations and modifications may of course be made without departing from the spirit and scope of the present invention.

What is claimed is:

1. A method for sealing a car body, comprising the steps of, sealing a car body with a one-pack urethane sealing material comprising:
100 parts by weight of a urethane prepolymer of a polyol compound and a polyisocyanate compound with a NCO/OH ratio of 1.2 to 3.0, and
30–200 parts by weight of precipitated calcium carbonate surface treated with a fatty acid alkali metal salt; and
curing the sealing material with heat and moisture without foaming so that the salt on the surface of the calcium carbonate adjusts the balance between the release of water from the calcium carbonate and increase In reaction rate by heating.

2. The method for sealing a car body according to claim 1, wherein the water content of the one-pack urethane sealing material is 0.01–0.5 wt %.

3. A method for sealing a car body comprising the steps of:

coating a joint portion of panels of a car body with a one-pack urethane sealing material comprising;
100 parts by weight of a urethane prepolymer of a polyol compound and a polyisocyanate compound with a NCO/OH ratio of 1.2 to 3.0, and
30–200 parts by weight of precipitated calcium carbonate surface treated with a fatty acid alkali metal salt; and
heating said car body panels to cure said sealing material with heat and moisture without foaming so that the salt on the surface of the calcium carbonate adjusts the balance between the release of water from the calcium carbonate and increase in reaction rate by heating.

4. The method for sealing a car body according to claim 3, wherein the water content of the one-pack urethane sealing material is 0.01–0.05 wt %.

* * * * *